United States Patent [19]

Padgeti

[11] 3,821,718

[45] June 28, 1974

[54] TRUNK TIMER WITH EXACT TIME FEATURE

[75] Inventor: Richard A. Padgeti, Lombard, Ill.

[73] Assignee: GTE Automatic Electric Laboratories Incorporated, Northlake, Ill.

[22] Filed: Oct. 25, 1972

[21] Appl. No.: 300,555

[52] U.S. Cl. .......... 340/173 R, 179/18 B
[51] Int. Cl. .......... G11c 13/00
[58] Field of Search .......... 179/18 B; 340/173 R

[56] References Cited

UNITED STATES PATENTS 3,729,622 4/1973 Lettieri .......... 340/173 RC

*Primary Examiner*—Terrell W. Fears
*Attorney, Agent, or Firm*—B. E. Franz

[57] ABSTRACT

A trunk timer for use in a communication system for providing a "grace period" on answer for the called party, as well as timing for forcibly releasing a held trunk circuit. The arrangement also is such that the "exact time" conservations which are established can be more precisely determined, when such "grace periods" and "forcibly released" timing are provided.

9 Claims, 6 Drawing Figures

TRUNK TIMER WITH EXACT TIME FEATURE

FIELD OF THE INVENTION

This invention relates to a centralized automatic message accounting system. More particularly, it relates to an improved trunk timer arrangement applicable for use in such a system.

In systems such as the hereinafter disclosed centralized automatic message accounting system, normal telephone ticketing procedures dictate the requirement for a trunk timer. These trunk timers, among other things, allow or provide for a "grace period" or time interval during which the called party, when answering a call, can determine if he is the party being called. This "grace period" also accommodates "hookswitch fumble" or other cases where the called party inadvertently drops the handset, and permits him to re-answer without creating a double charge for the same call.

Such trunk timers also are required because the "switch train" is controlled by the calling party. If the calling party does not "hang up" after the conversation is over, the trunk cannot be released to handle a new call. In this case, the trunk timer provides an interval during which the calling party must "hang up." If the calling party does not release the trunk during this interval, the trunk is "force released."

Also, in such systems, if a called party does, in fact, establish an answer condition, the answer condition is only recorded after the "grace period" time interval expires. Furthermore, when the conversation terminates, if the calling party hangs up first, a disconnect entry is recorded immediately. However, if a called party hangs up first, the disconnect entry is not recorded until the calling party hangs up, or until the calling party is forcibly released.

Accordingly, the amount of conversation time actually extends from the moment the answer condition is established, until the called party hangs up. However, according to the recorded information, the conversation extended from the time the answer condition was recorded until the disconnect entry was recorded. Therefore, the time interval allowed for the "grace period" is not considered, nor is the time interval between the time the called party hangs up and the time the disconnect entry is recorded, in those cases where the called party hangs up first, considered. If the "exact time" that conversations are established can be determined more precisely, increased revenues can be realized.

Accordingly, it is an object of the present invention to provide an improved centralized automatic message accounting system.

More particularly, it is an object to provide in such a system a "grace period" on answer for the called party.

Still another object is to provide in such a system a means for "force releasing" held trunks.

More particularly still, it is an object to provide an improved trunk timer arrangement, for providing both a "grace period" and a means for "force releasing" a held trunk in such systems.

Still another object is to provide a memory timer for a trunk timer.

Further still, it is an object to provide a single memory timer with different counting rates.

Further still, it is an object to provide a timing arrangement for more precisely determining the "exact time" conversations are established in systems where "grace periods" are providing on answer, and held trunks are "forcibly released."

Other objects of the invention will in part be obvious and will in part appear hereinafter The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

DESCRIPTION OF THE INVENTION

Figure 1:
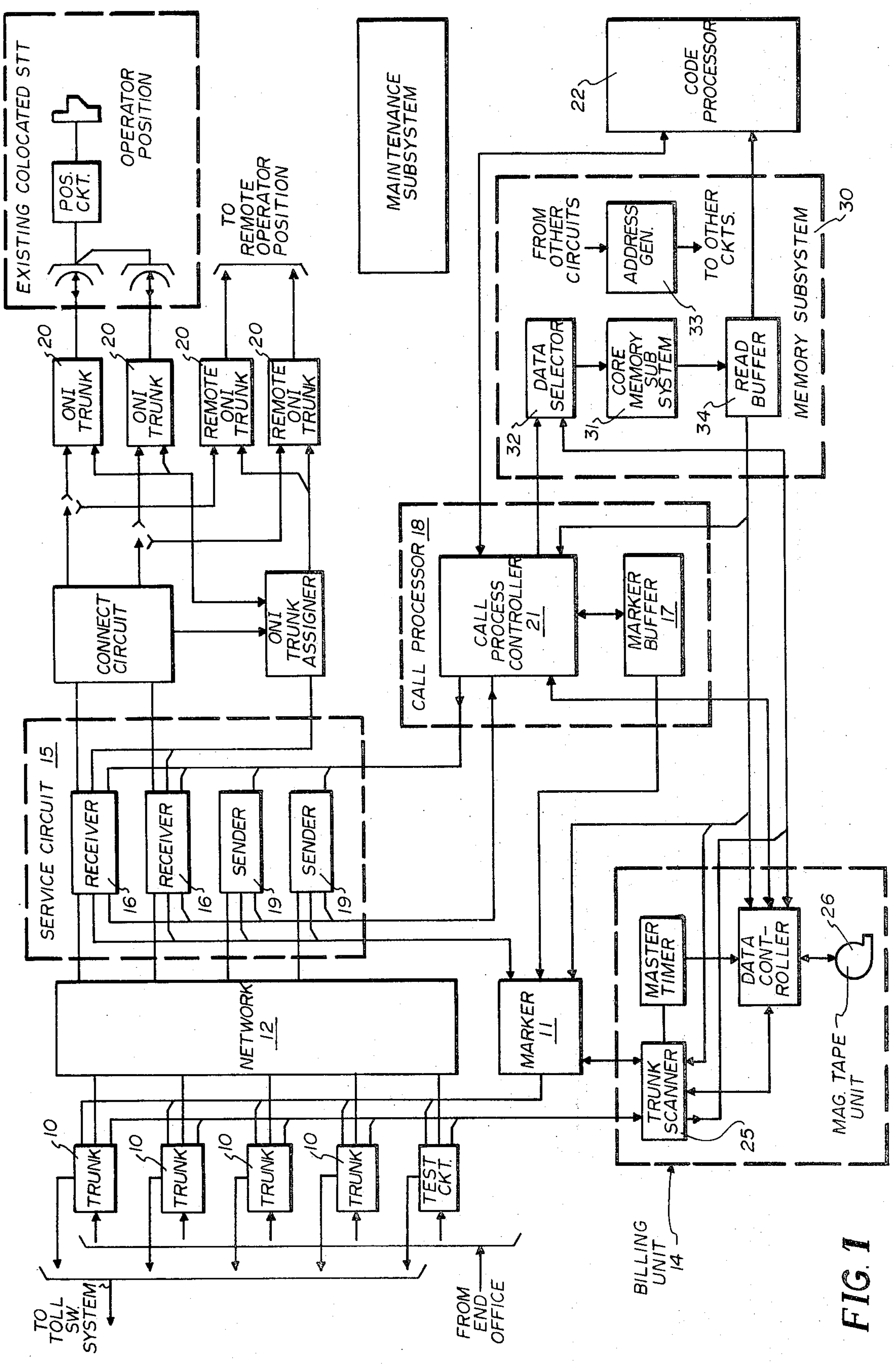
FIG. 1 is a functional block diagram of the centralized automatic message accounting system.

Referring now to the drawings, in FIG. 1 the centralized automatic message accounting system is illustrated in block diagram, and the functions of the principal equipment elements can be generally described as follows. The trunks 10, which may be either multifrequency (MF) trunks or dial pulse (DP) trunks, provide an interferface between the originating office, the toll switching system, the marker 11, the switching network 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2,000 inlets and 80 outlets. Each inlet extends into an A matrix and is defined by an inlet address. Each outlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in a trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities The functions of the receivers 16 are to receive MF 2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multi-entry system. Once this information is passed to the billing unit 14, where a complete initial entry is formated, the call will be forwarded to the toll switch for routing.

The call processor 18 consists of the marker buffer 17 and a call processor controller 21. There are 77 call stores in the call processor 18, each call store handling one call at a time. The call processor 18 operates on the 77 call stores on a time-shared basis. Each call store has a unique time slot, and the access time for all 77 call stores is equal to 39.4 MS, plus or minus 1 percent.

The marker buffer 17 is the elecronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call store has 8 rows and each row consists of 50 bits of information. The first and second rows are repeated in rows 7 and 8, respectively. Each row consists of 2 physical memory words of 26 bits per word. 25 bits of each word are used for storage of data, and the 26th bit is a parity bit.

The call processor controller 21 makes use of the information stored in the call store to control the progress of the call. It performs digit accumulation and the sequencing of digits to be sent. It performs fourth digit 0/1 blocking on a 6 or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which are originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via a tape transport operating in a continuous recording mode. After the calling and called director numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The iniial entry will include the time. Additional entries to the billing unit 14 contain answer and disconnect information.

The trunk scanner 25 is the means of conveying the various states of the trunks to the billing unit 14. The trunk scanner 25 is connected to the trunks by a highway extending from the billing unit 14 to each trunk. Potentials on the highway leads will indicate states in the trunks.

Each distinct entry (initial, answer, disconnect) will contain a unique entry identity code as an aid to the electronic data processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the 9 channel billing tape. The read function will allow the tape unit to be used to update the memory.

The recorder operates in the continuous mode at a speed of 5 inches per second, and a packing density of 800 bits per inch. Billing data is recorded in a multi-entry format using a 9 bit EBCDIC character (extended binary coded decimal interchange code). The memory subsystem 30 serves as the temporary storage of the call record, as the permanent storage of the code tables for the code processor 18, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word being read out, to be presented to the read buffer 34. With a read/restore command, the data being read out is also returned to core memory for storage at its previous location.

The method of operation of a typical call in the system, assuming the incoming call is via an MF trunk can be described as follows. When a trunk circuit 10 recognizes the seizure from the originating office, it will provide an off-hook to the originating office and initiate a call-for-service to the marker 11. The marker 11 will check the equipment group and position scanners to identify the trunk that is requesting service. Identification will result in an assignment of a unique 4 digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of ST, the call processor controller 21 will command the receiver 16 to instruct the trunk circuit 10 to return an off-hook to the calling office, and it will request the code processor 18.

The code processor 18 utilizes the called number to check for EAS blocking and other functions. Upon completion of the analysis, the code processor 18 will send to the call processor controller 21 information to route the call to an announcement or tone trunk, at up to 4 prefix digits if required, or provide delete information pertinent to the called number. If the call processor controller 21 determined that the call is an ANI call, it will receive, accumulate and store the calling number in the same manner as was done with the called number. After the call process controller 21 receives ST, it will request the billing unit 14 for storage of an initial entry in the billing unit memory. It will also command the receiver 16 to drop the trunk to receiver connection. The call processor controller 21 now initiates a request to the marker 11 via the marker buffer 17 for a trunk to sender connection. Once the marker 11 has made the connection and has transferred the identities to the marker buffer 17, the marker buffer will dump this information into the appropriate call store. The call processor controller 21 now interrogates the sender 19 for information that delay dial has been removed by the routing switch (crosspoint tandem or similar). Upon receipt of this information the call processor controller 21 will initiate the sending of digits including KP and ST. The call process controller 21 will control the duration of tones and interdigital pause. After sending of ST, the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1,370 characters. Once the billing unit memory is of the billing unit memory is recorded onto the magnetic tape.

The final result of actions taken by the system on a valid call will be a permanent record of billing information stored on magnetic tape in multi-entry format consisting of initial, answer, and disconnect or forced disconnect entries.

Figure 2:
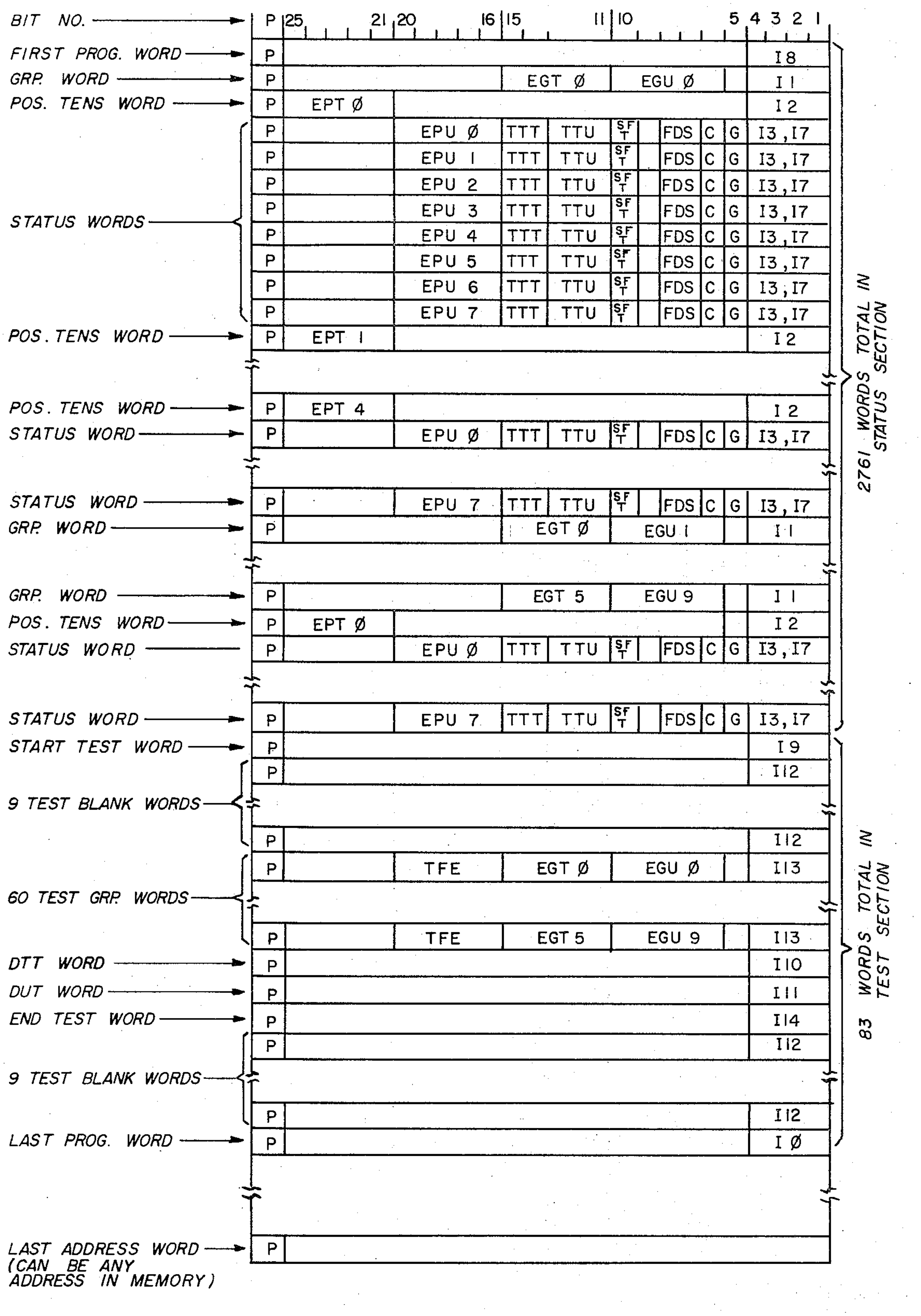
FIG. 2 illustrates the trunk scanner memory layout for the status section and the test section.

Answer timing, force disconnect timing and other timing functions such as, for example, a "grace period" timing interval on answer, in the present system, are provided by the trunk timers. These trunk timers are memory timers, and an individual timer is provided for each trunk in a trunk scanner memory which, as can be best seen in FIG. 2, illustrates the memory layout, comprises a status section and a test section.

The status section contains 1 word per ticketed trunk. Each word contains status, instruction, timing and sequence information. The status section also provides 1 word per trunk group which contains the equipment group number, and an equipment position tens word that identifies the frame. A fully equipped status section requires 2,761 words of memory representing 2,000 trunks spread over 60 groups plus a status section "start" word. As each status word is read from memory, it is stored in a trunk scanner read buffer (not shown). The instruction is read by a scanner control to identify the contents of the word. The scanner control logic acts upon the timing, sequence and status information, and returns the updated word to the trunk scanner memory and it is written into it for use during the next scanner cycle.

The test section contains a maximum of 83 words: a start word, a last programmed word, 18 delay words, 2 driver test words, 1 end-test word and 1 word for each equipment group. The "start test" word causes a scan point test to begin. The delay words allow time for scan point filters to charge before the trunk groups are scanned, with the delay words containing only instructional data. The equipment group words contain a 2 digit equipment group identity and 5 trunk frame equipped bits. The trunk frame equipped bits (1 per frame) indicates whether or not a frame exists in the position identified by its assigned bit. The delay words following the equipment group allow the scan point filters to recharge before the status section of memory is accessed again for normal scanning. The Last Program word inhibits read and write in the trunk scanner memory until a trunk scanner address generator has advanced through enough addresses to equal the scanner cycle time. When the cycle time expires, the trunk scanner address generator returns to the start of the status section of memory and normal scanning recommences.

The trunk scanner memory and the trunk scanner read buffer are not part of the trunk scanner 25, however, the operation thereof is controlled by a scanner control which forms a part of the trunk scanner 25 of the billing unit 14. The trunk scanner 25 maintains an updated record of the status of each ticketed trunk, determines from this status when a billing entry is required, and specifies the type of entry to be recorded. The entry includes the time it was initiated and the identification of its associated trunk.

Scanning is performed sequentially, by organizing the memory in such a manner that when each word is addressed, the trunk assigned to that address is scanned. This causes scanning to progress in step with the trunk scanner address generator. During the address advance interval, the next scanner word is addressed and, during the read interval, the word is read from memory and stored in the trunk scanner read buffer. At this point, the trunk scanner 25 determines the operations to be performed by analyzing the word instruction.

Figure 3:
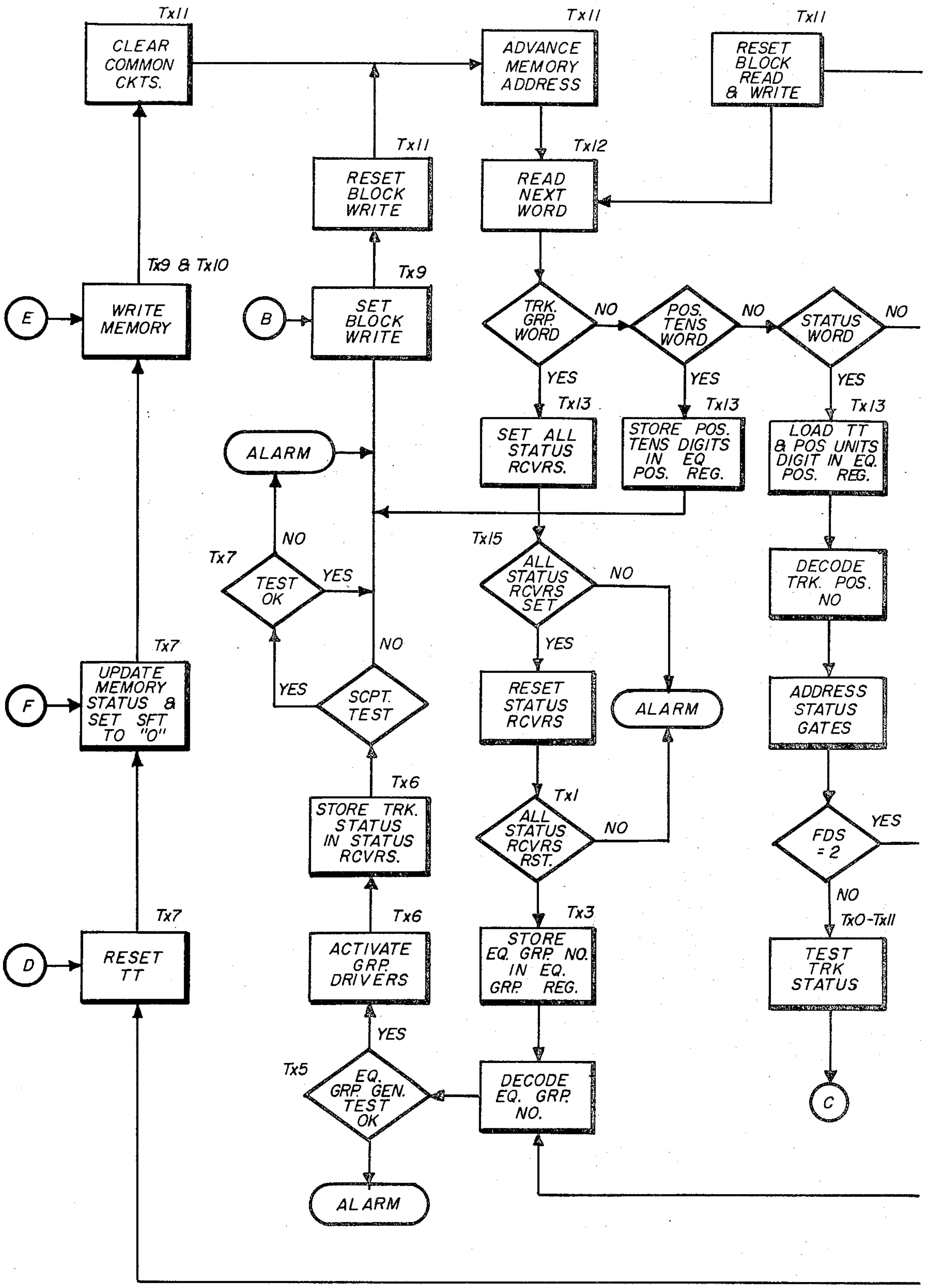
FIGS. 3–5 are a flow chart of the trunk scanner operations.
Figure 4:
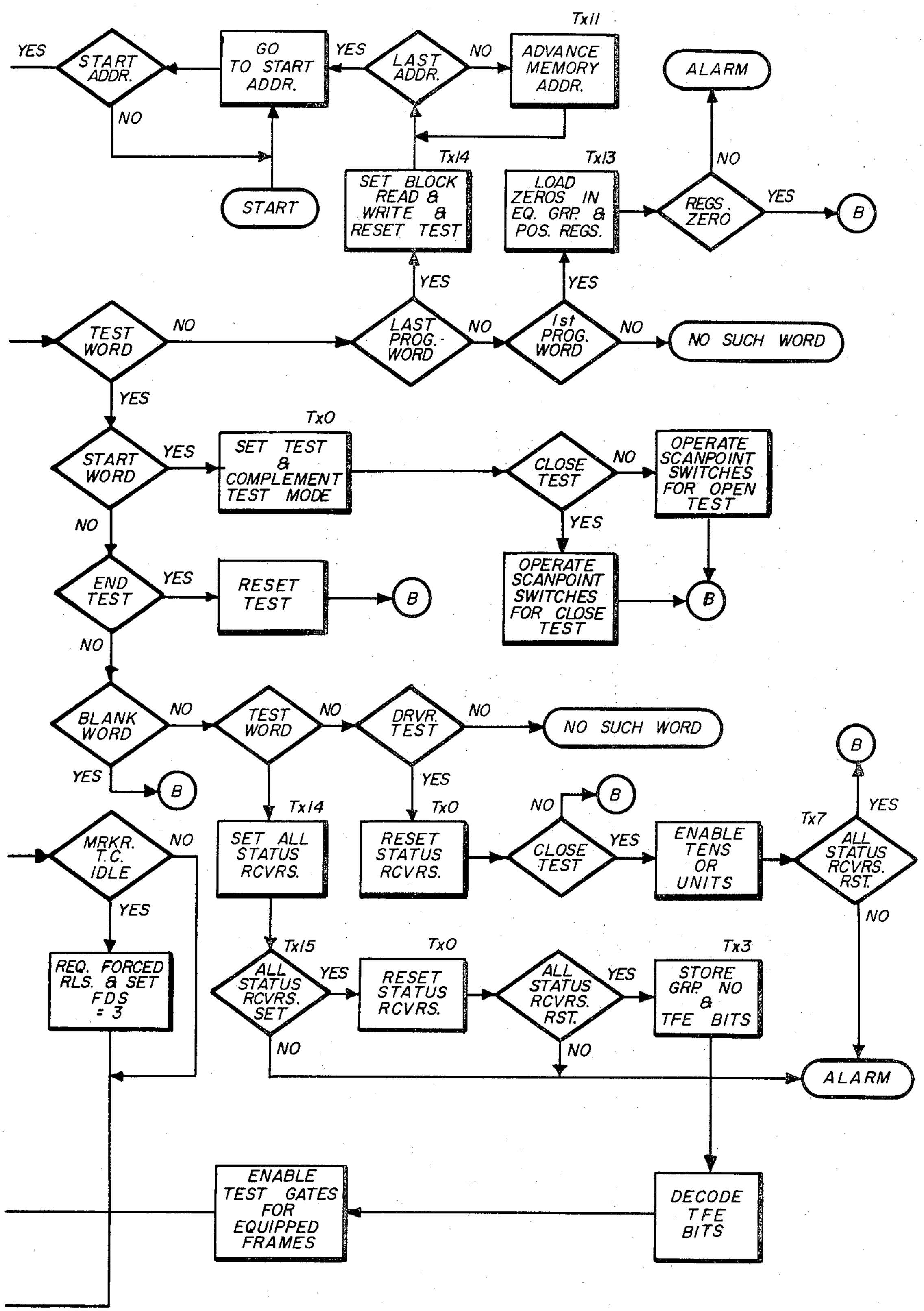
Figure 5:
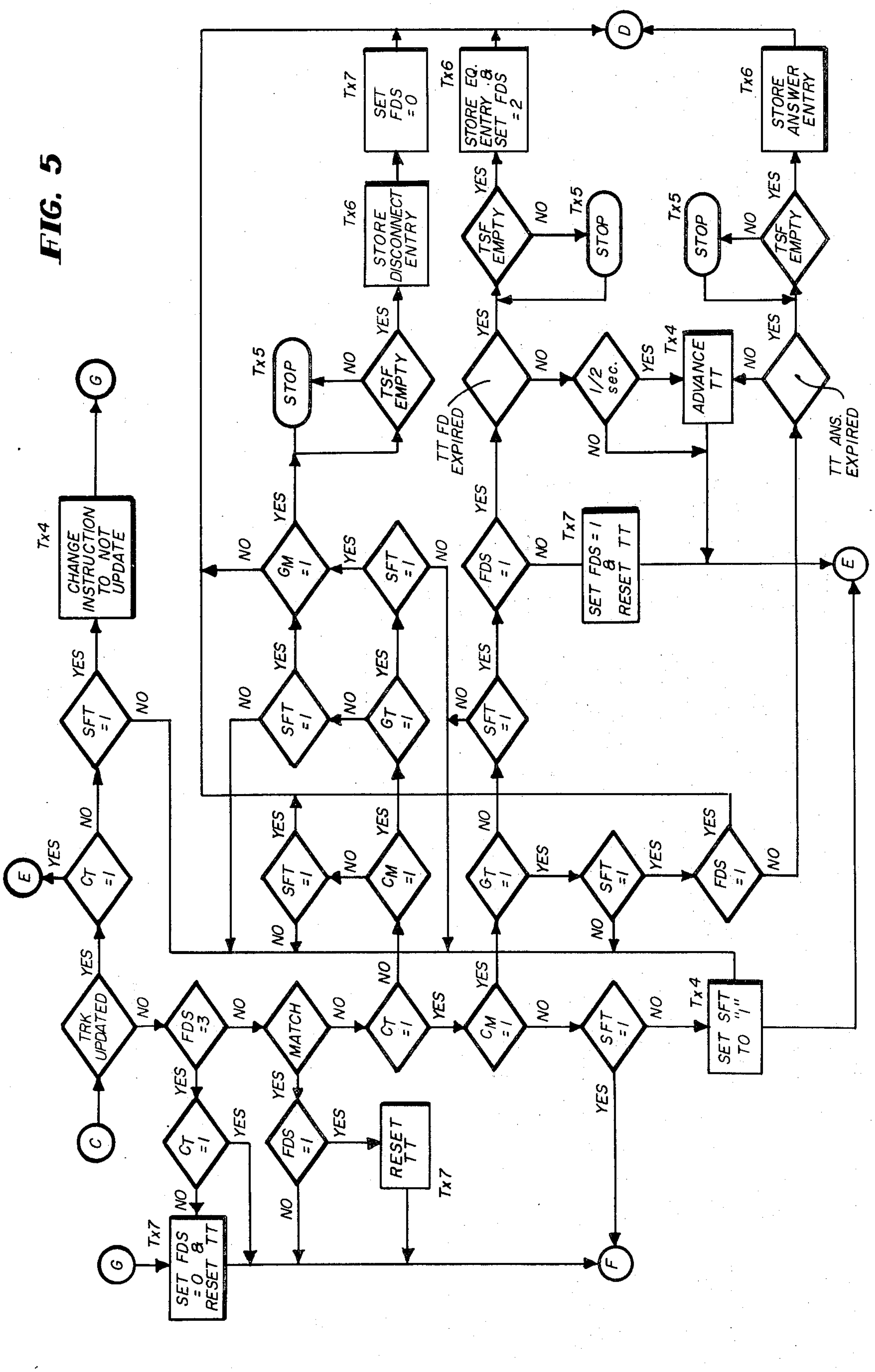
Figure 6:
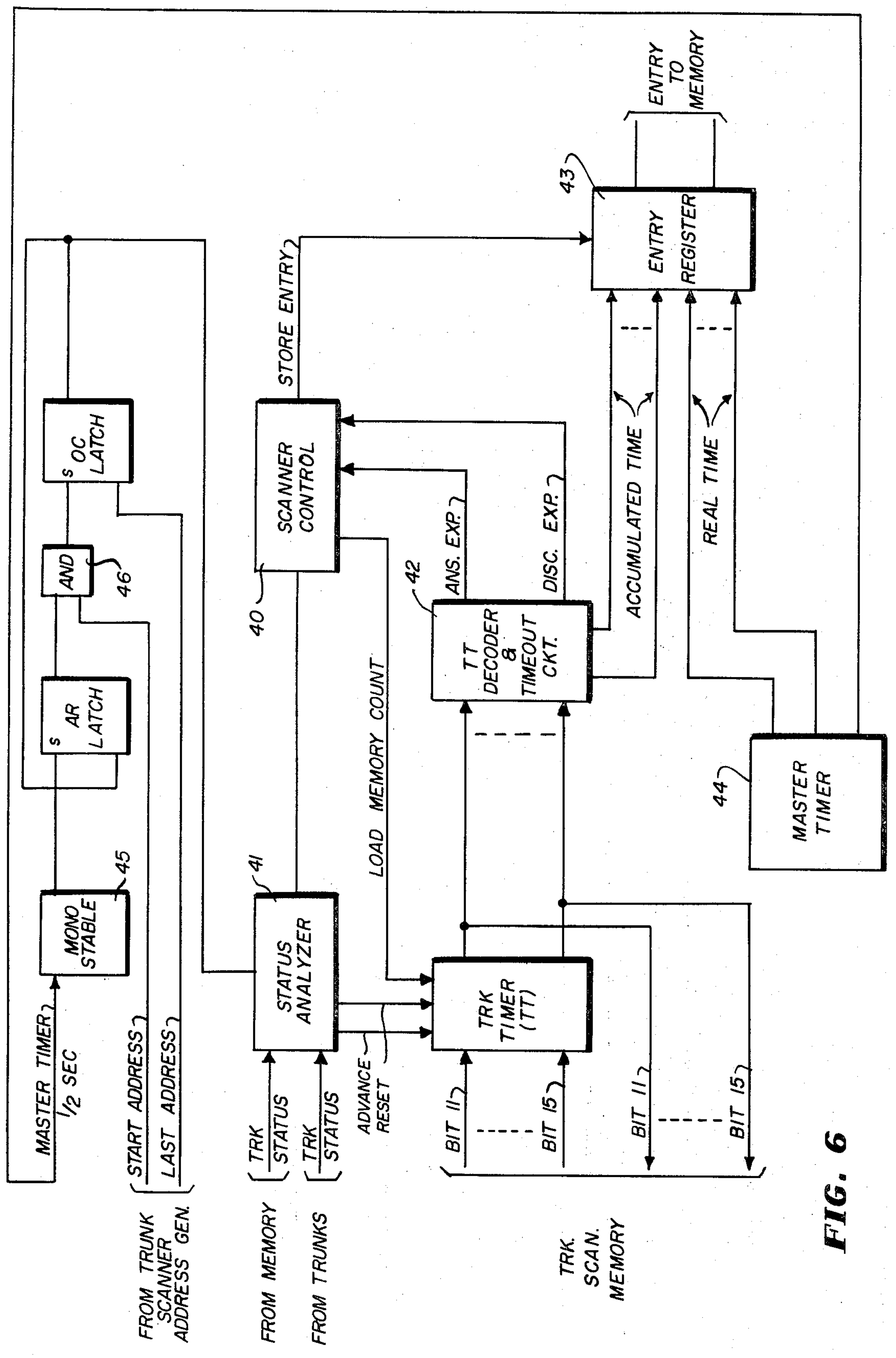
FIG. 6 is a functional block diagram of a portion of the scanner controller in the trunk scanner of the billing unit.

Referring now to FIGS. 3, 4 and 5, which are flow charts of the trunk scanner operations, the operation of the latter as well as the trunk timer can be described.

As indicated above, scanning is performed sequentially. If all trunks in all groups are scanned in numerical sequence beginning with trunk 0000, scanning would proceed in the following manner:

Step 1. Trunk 0000 located in frame 00 (lineup 0, column 0) in the top file, leftmost card position would be scanned first.

Step 2. All trunks located in frame 00 and the leftmost card position would be scanned next from the top file to the bottom.

Step 3. Scanning advances to frame 01 (lineup 0, column 1) and proceeds as in Step 2.

Step 4. Scanning proceeds as in Step 3 until frame 04 has been scanned.

Step 5. The scanner returns to frame 00 and Step 2 is repeated for the next to leftmost card position.

Step 6. The sequence just described continues until all 10 card positions in all 5 columns have been examined.

Step 7. The entire process is repeated in lineups 1 through 5.

When a memory word instruction identifies a trunk group word, the status receivers are cleared to prepare for scanning the trunks specified in the group word. The trunk group digits stored in the trunk scanner read buffer (TSRB) are transferred into the equipment group register.

After the trunk group number is decoded, it is transformed into binary code decimals (BCD), processed through a 1-out-of-N check circuit, and applied to the AC bus drivers (ACBD). The drivers activate the scan point circuits via the group leads and the trunk status is returned to the receivers.

A group address applied to the drivers causes the status of all trunks in 1 lineup and 1 card position and all columns to be returned to the receivers. The group tens digit specifies the trunk frame lineup and the group units digit identifies the card slot.

When a status word is read from memory, it sets the previous count of a trunk timer (TT) into the trunk timer.

If the trunk is equipped and the forced disconnect sequence equals 2 (FDS=2), a request to force release the trunk is transmitted to the marker 11. If FDS does not equal 2, the present condition of the ticketing contacts in the trunk is tested. If the instruction indicates that the trunk is in an updated condition (the trunks associated memory word was reprogrammed) it is tested for idle. If the trunk is idle, its instruction is changed to denote that it is ready for new calls. If the trunk is not idle, no action is taken and the trunk scanner 25 proceeds to the next trunk.

If the trunk is not in the updated condition and FDS=3, the trunk is tested for idle. If the trunk is idle, FDS is set to 0 and TT is reset.

If FDS does not equal 3 and a match exists between the present contact status and the previous contact status stored in memory (bits 5 and 6) the FDS memory bits are inspected for a count equal to 1. If FDS=1, TT is reset and the memory contact status is updated. If FDS does not equal 1, TT is not reset.

During any analysis of a trunk status, a change in the contact configuration of a trunk is not considered valid until it has been examined twice.

One bit (SFT) is provided in each memory status word to indicate whether or not a change in status of the trunk was detected during the previous scan cycle.

When a change in status is detected, SFT is set to 1. If SFT=1 on the next cycle, the status is analyzed and SFT is set to 0.

If a mismatch exists between the present contact condition and that previously stored in memory, the status has changed and a detailed examination of the status is started.

If CT=1, the trunk is busy and so the previous condition of the contact is inspected. If the trunk previously was idle, CM=0. Before continuing the analysis, it must be determined if this is the first indication of change in the trunk status by examining the "second look" bit (SFT). If SFT=0, it is set to equal 1, and the analysis of this trunk status is discontinued until the next scanner cycle. If SFT=1, the memory status is updated and SFT is set to equal 0.

If CT=1, the trunk is cut through and CM is inspected to determine if the memory status was updated. If CM=1, the GT contact status must differ from GM since it was already determined that a mismatch exists. If GT=0, answer has not occurred. If GT=1, and this condition existed during the previous scan cycle, SFT=1 also. If these conditions are true and FDS does not equal 1, TT is advanced and answer timing begins. If these conditions persist for 8 scanner cycles (approximately 1 second), answer is confirmed and an entry will be stored in the trunk scanner formater (TSF). If answer is aborted (possibly hookswitch fumble) before the 1 second answer time (time is adjustable) expires, TT remains at its last count. When the answer condition returns, answer timing continues from the last TT count. Thus, answer timing is cumulative.

After the answer entry is stored, which includes the TT count, TT is reset, SFT is set to 0, and the new contact status is written into memory.

If a mismatch exists and CT=0, the previous state of this contact is inspected by examining bit 5 in the trunk scanner read buffer (TSRB). If CM=1, the state of the terminating end of the trunk is tested. If GT=1, then the condition of the trunk has just changed from answer to disconnect. If this condition existed during the previous scan cycle, SFT=1 and a disconnect entry is stored in the TSF.

After the disconnect entry is stored, which includes the TT count, TT is reset, FDS and SFT are set to 0, and the new status is written into memory.

If a mismatch exists and the originating end of a trunk is not released, both CT and CM equals 1. If GT=0 after the previous scan cycle, FDS is tested. If this change just occurred, FDS does not equal 1. Since FDS does not equal 1, it will be set equal to 1 and TT will reset. FDS=1 indicates that forced disconnect timing is in progress.

While the conditions just described exist, i.e., mismatch, CT=1, CM=1, GT=0 and FDS=1, TT will advance 1 count during each scanner cycle, if ½ second has elapsed since the last scan cycle. TT will continue to advance until it reaches a count of 20 (approximately 10 seconds) when a forced disconnect entry will be stored in the TSF.

When the entry is stored, FDS is set at 2 indicating that the trunk is to be force released. After the entry is stored, which includes the TT count, TT is reset, SFT is set to 0, and the new status is written into memory.

After the status and test sections of the memory have been accessed, the Last Program word is read from memory and stored in the trunk scanner read buffer. This word causes read/write in the trunk scanner portion of memory to be inhibited and deactivates the scan point test. The trunk scanner address generator will continue to advance, however, until sufficient words have been addressed to account for one scan cycle. When a predetermined address, the Last Address, is reached, block read/write is removed and the address generator returns to the Start Address (First Program Word) of the scanner memory.

From the above description, it can be seen that the trunk timer TT is used for timing both the answer timing and the forced disconnect timing. Furthermore, in the case of the latter, the counting rate is different, with the counting rate being derived from a master timer rather than from the memory timer. The manner in which these different counting rates are derived can be seen by reference to FIGS. 2 and 3–5.

As indicated above, the trunk timers are memory timers, and an individual timer is provided for each trunk in the trunk scanner memory, in its assigned memory status word, in memory bits 11 through 15. These memory status words, identified by the instructions I3 and I7, are read from memory during each scanner cycle, and a scanner control circuit 40 couples a LOAD MEMORY COUNT command to the trunk timer TT to enable it to receive the memory bits 11 through 15. The trunk timer TT is an electronic counter, and the memory bits 11, 12 and 13 (TTU) provide a maximum count of 8. The memory bits 14 and 15 (TTT) count groups of 8 up to a maximum of 4 counts of 8, so that the trunk timer TT therefore counts in octal up to 32.

As can be seen in the flow chart of the trunk scanner operation (FIGS. 3, 4 and 5), during answer timing, the count of the trunk timer TT is advanced by one each scanner cycle. The count is advanced by a status analyzer circuit 41 which analyzes the trunk status as read from the trunk scanner memory and the trunk status as coupled to it from the trunk circuits, to determine if any change has occurred in the status thereof during succeeding scan cycles. In the illustrated embodiment, one scan cycle equals approximately 200 milliseconds and, therefore, under answer timing conditions, the counting rate of the trunk timer TT is approximately 200 milliseconds. In other words, the memory bits 11 through 15 are read from memory to set the count of the trunk timer TT, the count advanced by one, and written back into memory, during each scan cycle.

As fully described above, a pre-selected "grace period" is provided by means of a strapping field and when this "grace period" expires, a decoder and timeout circuit 42 couples an ANSWER EXPIRED signal to the scanner control circuit 40. The latter, in turn, sends a STORE ENTRY command to an entry register 43, to write an ANSWER ENTRY into memory.

During the "grace period", if the called party "hangs up", advance command to the trunk timer is disabled and the trunk timer TT remains at its last count until the calling party terminates the call, or the called party reanswers. If the calling party releases, the status analyzer circuit 41 operates to reset the trunk timer TT, and the call is terminated. If the called party re-answers, the advance command is again enabled and the trunk timer TT continues to advance from its last count, until the "grace period" expires. At this time, the ANSWER EXPIRED signal is coupled to the scanner control circuit 40, as indicated above.

During forced disconnect timing, the memory bits 11 through 15 are still used for timing, but the counting rate is different. Forced disconnect timing is initiated when FDS=1, and the trunk timer TT starts timing.

In this case, however, the base counting rate is derived from the system's master timer 44 which is an electrically operated and controlled clock pulse generator capable of providing an output clock pulse every ½ second. The ½ second clock pulses are coupled to a monostable multivibrator 45 which is operated to SET an advance ready latch circuit AR. If the latch circuit AR is SET when the START ADDRESS (FIG. 2) is read from memory, the AND gate 46 is enabled by the coincidence of this START ADDRESS signal and the SET output from the latch circuit AR to SET the one cycle latch circuit OC. The SET output of the latch circuit OC is coupled to the latch circuit AR to reset it, and to the status analyzer circuit 41.

With the latch circuit OC SET, all of the status words having FDS=1, the called party "on hook" and the calling party "off hook," that is, mismatch, CT=1, CM=1, GT=0 and FDS=1, will have the count of the trunk timers TT advanced by one count. When the LAST ADDRESS word is read from memory, the latch circuit OC is RESET and counting ceases until it is again reset ½ second later, for all those trunk circuits having forced disconnect timing in effect. This process is repeated until the pre-selected "forced disconnect" interval (when the trunk timer TT count is 10 or approximately 10 seconds in the illustrated embodiment) expires, causing FDS to advance to 2. At this time the decoder and timeout circuit 42 couples a DISCONNECT EXPIRED signal to the scanner control circuit 40, and the latter couples a STORE ENTRY command to the entry register 43, to write the DISCONNECT entry into memory storage.

A further feature provided by the above-described timing arrangement is that the "exact time" that the call is first answered, or terminated, can be easily determined. For example, assume that the called party drops the handset when answering the telephone (hookswitch fumble), answer timing is suspended, in the manner described above, until the answer condition returns, or until the calling party disconnects. If the answer condition returns, when the "grace period" expires, the decoder and timeout circuit 42 couples the ANSWER EXPIRED signal to the scanner control circuit 40 and the latter couples the STORE ENTRY command to the entry register 43, to write an ANSWER ENTRY into memory. This ANSWER ENTRY contains the real time that the answer entry was initiated, with the real time being coupled to the entry register 43 from the master timer 44. The time accumulated in the trunk timer TT likewise is coupled to the entry register 43 from the decoder and timeout circuit 42, and can be subtracted from the real time recorded in the ANSWER ENTRY to obtain the "exact time" that the call was first answered.

This feature also is used when the conversation is terminated by either party. If the calling party disconnects first, a DISCONNECT ENTRY which again contains the real time is immediately written into memory by the entry register 43. The time accumulated in the trunk timer TT therefore equals zero and, when subtracted from the real time, the exact time which, of course, is the time recorded in the DISCONNECT ENTRY, is still obtained.

If the called party disconnects first, time is accumulated in the trunk timer TT until the time allowance for forced disconnect expires, in the manner described above. When the time expires, the DISCONNECT ENTRY containing the real time is written into memory, and the trunk circuit is forcibly released. By subtracting the time accumulated in the trunk timer TT from the real time recorded in the DISCONNECT ENTRY, the "exact time" of disconnect can be determined.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A method of using a single memory timer in a system during the existence of a first and a second system condition comprising the steps of:

a. reading out of a memory each scan cycle the memory bits forming said memory timer;
b. coupling said memory bits into counter means;
c. providing an output from a master timer representing real time;
d. initiating the count of said counter means when said first system condition is initiated;
e. advancing by one the count of said counter means each scan cycle said first system condition exists until a preestablished allowance time expires;
f. simultaneously coupling the count of said counter means and the real time from said master timer at the time said pre-established allowance time expires into register means;
g. subtracting the count of said counter means from the real time from said master timer to thereby determine the exact time said first system condition was initiated;
h. disabling the advancement of said counter means for a predetermined time interval corresponding to one or more scan cycles before advancing by one the count registered therein when said second system condition exists; and
i. writing said count back into the memory during the same scanning cycle, whereby a first and a second counting rate is derived from said single memory timer when said first and second system conditions exist.

2. The method of claim 1, further including the steps of initiating the count of said counter means when said first system condition is initiated, disabling the advancement of the count of said counter means during a scan cycle when said first system condition is absent during any scan cycle after said first system condition has been once initiated, and enabling the advancement of the count of said counter means when said first system condition is again established, thereby providing a grace period during which said first system condition can be absent after once being initiated.

3. The method of claim 1, further including the step of resetting the count of said counter means when said first system condition has been established for a preestablished allowance time.

4. The method of claim 1, wherein said first system condition is an answer timing condition established when a called party answers a call, and wherein the count of said counter means is initiated when a called party answers a call to establish an answer condition, the advancement of the count of said counter means being disabled when the called party hangs up after said answer condition is once established until said answer condition returns, and the advancement of the count of said counter means being enabled when said answer condition is re-establishdd, whereby a grace period is established during which the called party can hang up and re-establish a call after an answer condition is once established.

5. The method claim 4, wherein means is subtracted from the real time from said master timer, to thereby determine the exact time the answer condition was first established.

6. The method of claim 1, wherein said second system condition is a forced disconnect condition and wherein said forced disconnect condition is established when a called party hangs up, the advancement of said counter means being disabled for a predetermined time interval corresponding to a plurality of scan cycles before advancing by one the count registered by said counter means during the existence of said forced disconnect condition, and the count of said counter means being written back into said memory during each scan cycle.

7. The method of claim 6, wherein the count registered by said counter means is subtracted from the real time from said master timer, to thereby determine the exact time the calling party hung up.

8. A timing arrangement for use in a system having a memory for storing a plurality of memory words including a start address, a last address and a plurality of memory bits forming a memory timer, said timing arrangement comprising counter means, said memory bits being read out of said memory during each scan cyle thereof and coupled into said counter means to set the count thereof, counter advancing means operated responsive to a first system condition to advance by one the count of said counter means during each scan cycle the first system condition exists, a master timer, a first and a second latching circuit means, means operated by said master timer during the existence of the second system condition to set said first latch means, gate means enabled upon the coincidence of said first latch means being set and said start address being read from said memory to set said second latch means, said second latch means upon being set causing said counter advancing means to advance by one the count of said counter means, said last address upon being read from said memory resetting said second latch means, and the count of said counter means being written into said memory during each scan cycle, whereby a first counting rate is provided during said first system condition and a second counting rate is provided during said second system condition, register means, decoder and timeout means coupled to said counter means and said register means for coupling the count of said counter means into said register means when said first system condition has existed for a pre-established allowance time, said master timer being coupled to said register means and providing a real time input to said register means, and control means operated by said decoder and timeout means for registering in said register means the real time from said master timer when said first system condition has existed for said pre-established allowance time, whereby the exact time said first system condition was established can be determined by subtracting the count of said counter means from the real time from said master timer.

9. The timing arrangement of claim 8, wherein said decoder and timeout means is further operable to couple the count of said counter means into said register means when said second system condition has existed for a pre-established allowance time and to operate said control means to register in said register means the real time from said master timer when said second system condition has existed for said pre-established allowance time, whereby the exact time said second system condition was established can be determined by subtracting the count of said counter means from the real time from said master timer.

* * * * *

UNITED STATES PATENT OFFICE

CERTIFICATE OF CORRECTION

Patent No. 3,821,718 Dated June 28, 1974

Inventor(s) RICHARD A. PADGETT

It is certified that error appears in the above-identified patent and that said Letters Patent are hereby corrected as shown below:

On the cover page [75] change "Padgeti" to read -- Padgett --

Signed and sealed this 15th day of October 1974.

(SEAL)
Attest:

McCOY M. GIBSON JR.
Attesting Officer

C. MARSHALL DANN
Commissioner of Patents